US008696236B1

(12) United States Patent
Frelich

(10) Patent No.: US 8,696,236 B1
(45) Date of Patent: Apr. 15, 2014

(54) PAVING MACHINE HAVING AUTOMATICALLY ADJUSTABLE OPERATOR STATION CONTROLS

(71) Applicant: Caterpillar, Inc., Peoria, IL (US)

(72) Inventor: Toby A Frelich, Saint Michael, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 0 days.

(21) Appl. No.: 13/755,842

(22) Filed: Jan. 31, 2013

(51) Int. Cl.
*E01C 23/01* (2006.01)
(52) U.S. Cl.
USPC .......... 404/72; 404/84.05; 404/118; 244/99.4
(58) Field of Classification Search
USPC ............. 404/72, 83–84.1, 101, 118; 244/99.4
See application file for complete search history.

(56) References Cited

U.S. PATENT DOCUMENTS

| | | | |
|---|---|---|---|
| 2,954,088 A | 9/1960 | Williamson et al. | |
| 3,412,659 A | 11/1968 | Harbke et al. | |
| 3,453,939 A * | 7/1969 | Fairchild et al. | 404/84.05 |
| 3,691,916 A * | 9/1972 | Martenson et al. | 404/84.2 |
| 3,967,912 A * | 7/1976 | Parker | 404/84.05 |
| 3,997,277 A * | 12/1976 | Swisher et al. | 404/84.05 |
| 4,790,711 A * | 12/1988 | Calaway | 414/635 |
| 5,405,214 A * | 4/1995 | Campbell | 404/80 |
| 7,413,377 B2 * | 8/2008 | Pontano, III | 404/118 |
| 7,828,109 B2 * | 11/2010 | Chang | 180/400 |
| 8,370,002 B2 * | 2/2013 | Stecko et al. | 701/3 |

* cited by examiner

*Primary Examiner* — Raymond W Addie
(74) *Attorney, Agent, or Firm* — Finnegan, Henderson, Farabow, Garrett & Dunner LLP

(57) ABSTRACT

A method of operating a control system for a machine is disclosed. The method may include receiving machine control settings for a first operator station from an operator and receiving an input reflecting a desire to switch control to a second operator station. The method may also include automatically adjusting control settings of the second operator station to match the control settings of the first station. The method may further include deactivating the first operator station once the control settings of the second operator station substantially match those of the first operator station.

20 Claims, 4 Drawing Sheets

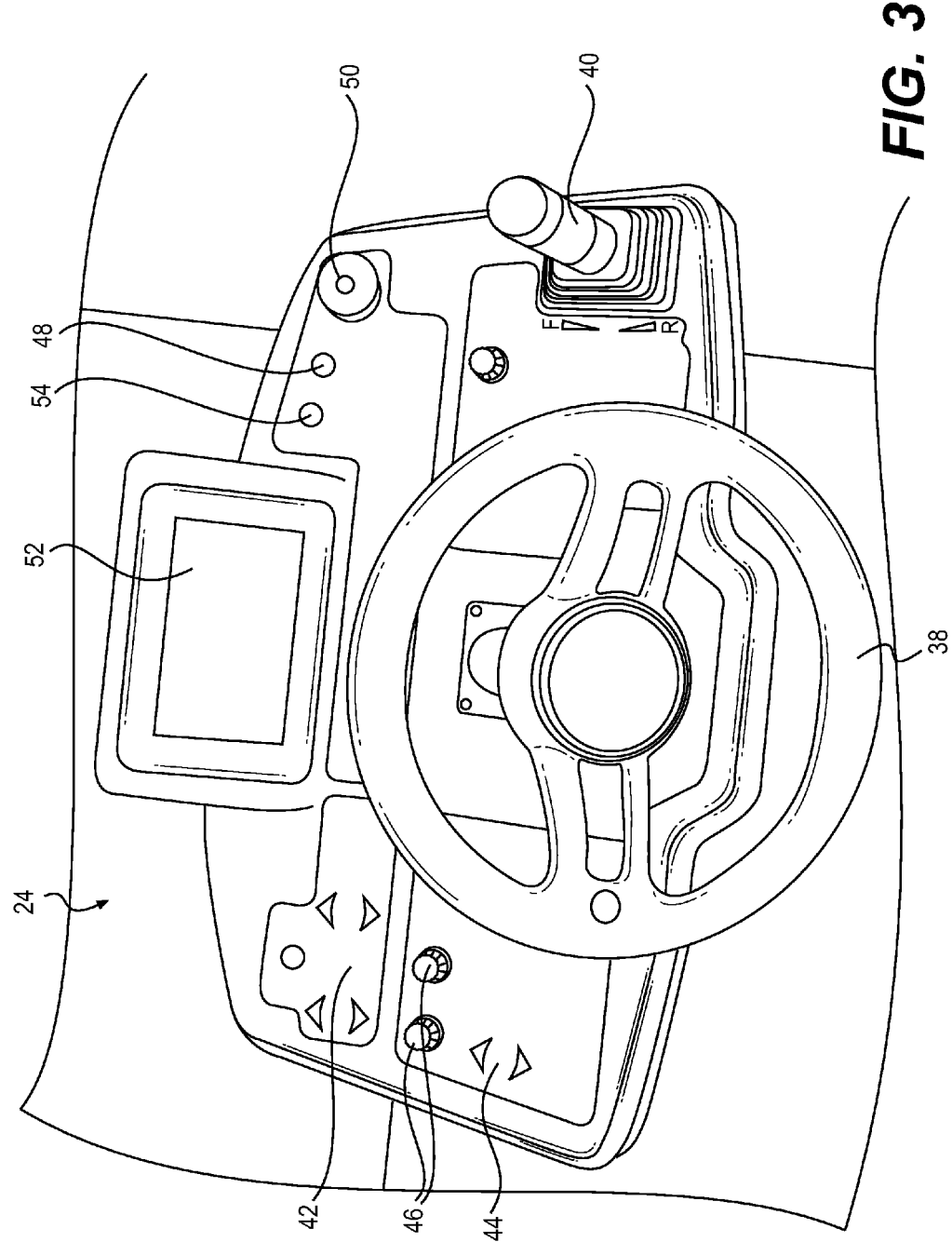

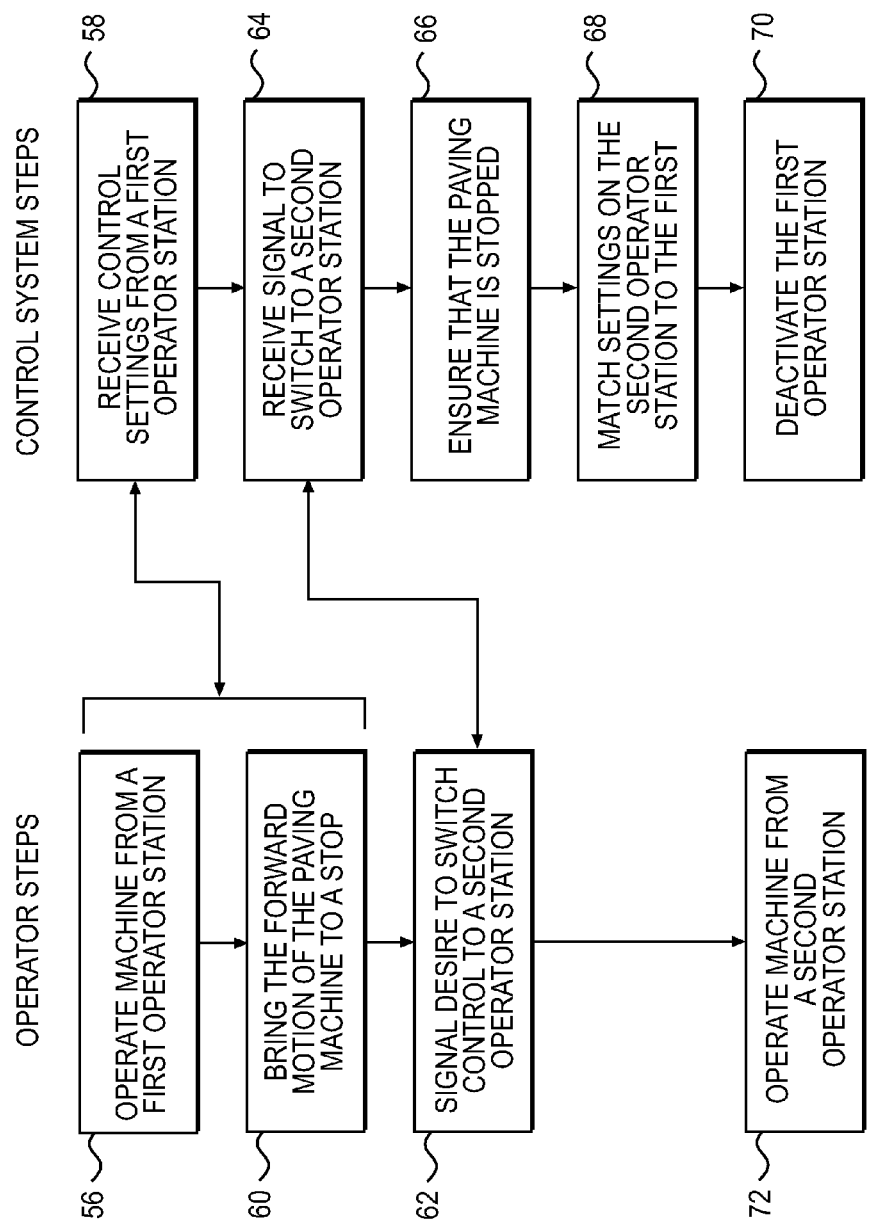

PAVING MACHINE HAVING AUTOMATICALLY ADJUSTABLE OPERATOR STATION CONTROLS

TECHNICAL FIELD

The present disclosure is directed to a paving machine and, more particularly, to a paving machine having automatically adjustable operator stations.

BACKGROUND

Machines such as track pavers are large, and require their operator to follow a guide line on one side of the machine. In order to allow the operator to see these lines and steer the machine accurately, the operator must be able to see over or around the machine's parts. Due to the size of machines like track pavers, a single operator station centered atop the vehicle may not allow the operator the best vantage point to steer the machine.

U.S. Pat. No. 2,954,088 issued to Williamson et al. on Sep. 29, 1958 illustrates one attempted solution to this problem. The '088 patent discloses a road roller machine having two operator stations located at opposing sides of the machine. This arrangement allows the operator to move from one side of the machine to the other to be able to see the guide line that needs to be followed. The '088 patent, for example, discloses each operator station having a seat, a steering column, and various controls for operating the machine from either operator station.

Having dual operator stations helps the operator to steer the machine, but does have some drawbacks as it is currently employed. One such issue is that when moving from one station to the other, the controls must be manually reset. On many machines, the number of controls to be manually reset may require the operator to go back and forth between stations multiple times to ensure all of the settings are the same on both stations before being able to begin operating the machine again. For example, a paving machine may have ten or more control settings including throttle, conveyor conditions (e.g. direction, speed), or screed conditions (e.g. height, temperature, vibration). An operator may have to set each one manually by either walking back and forth to look at the controls, or relying on their memory. Relying on the operator's memory alone may result in settings being different from station to station, and that in turn may cause defects in the work being done. Having to reset the controls manually can result in time being lost, and introduces the opportunity for operator error with significant consequences.

The present disclosure is directed toward one or more of the problems set forth above and/or other problems of the prior art.

SUMMARY

In one aspect, the present disclosure is directed to a method of operating a machine. The method may include receiving machine control settings for a first operator station from an operator and receiving an input reflecting a desire to switch control to a second operator station. The method may also include automatically adjusting control settings of the second operator station to match the control settings of the first station. The method may further include deactivating the first operator station once the control settings of the second operator station substantially match those of the first operator station.

In another aspect, the present disclosure is directed to a control system for a machine. The control system may include a first operator station having a first plurality of manual control devices. The control system may also include a second operator station having a second plurality of manual controls substantially identical to the first plurality of manual control devices. The control system may further include a processor in communication with the first and second pluralities of manual control devices. The processor may be configured to receive control settings from the first operator station, receive input indicative of a desire to switch control to the second operator station, and automatically adjust control settings of the second operator station to match the control settings of the first operator station.

In another aspect, the present disclosure is directed to a computer readable medium having executable instructions stored thereon for performing a method of operating a machine. The method may include receiving machine control settings from an operator for a first operator station and receiving an input indicative of desire to switch control to a second operator station. The method may also include automatically adjusting control settings of the second operator station to substantially match the control settings of the first operator station based on the input. The method may further include deactivating the first operator station once the control settings of the second operator station substantially match those of the first operator station.

In another aspect, the present disclosure is directed to a machine. The machine may include a hopper for holding paving material before it is applied to a surface, a screed for smoothing paving material as it is applied to the surface, and a traction device for propelling the machine along the surface. The machine may also include a first operator station located at one side of the machine and having a first plurality of manual control devices and a second operator station located at an opposite side of the machine and having a second plurality of manual controls substantially identical to the first plurality. The machine may further include a processor in communication with the first and second pluralities of manual control devices and configured to receive control settings for the first operator station associated with operation of at least one of the hopper, the screed, and the traction device, receive an input via the first operator station indicative of desire to switch control to the second operator station, and automatically adjust control settings for the second operator station to substantially match the control settings of the first operator station based on the input.

BRIEF DESCRIPTION OF THE DRAWINGS

FIG. 3 is a diagrammatic illustration of an operator station that may be located on the exemplary paving machine of FIGS. 1 and 2; and FIG. 4 is a flowchart illustrating an exemplary method of operating the paving machine of FIGS. 1 and 2.

DETAILED DESCRIPTION

Figure 1:
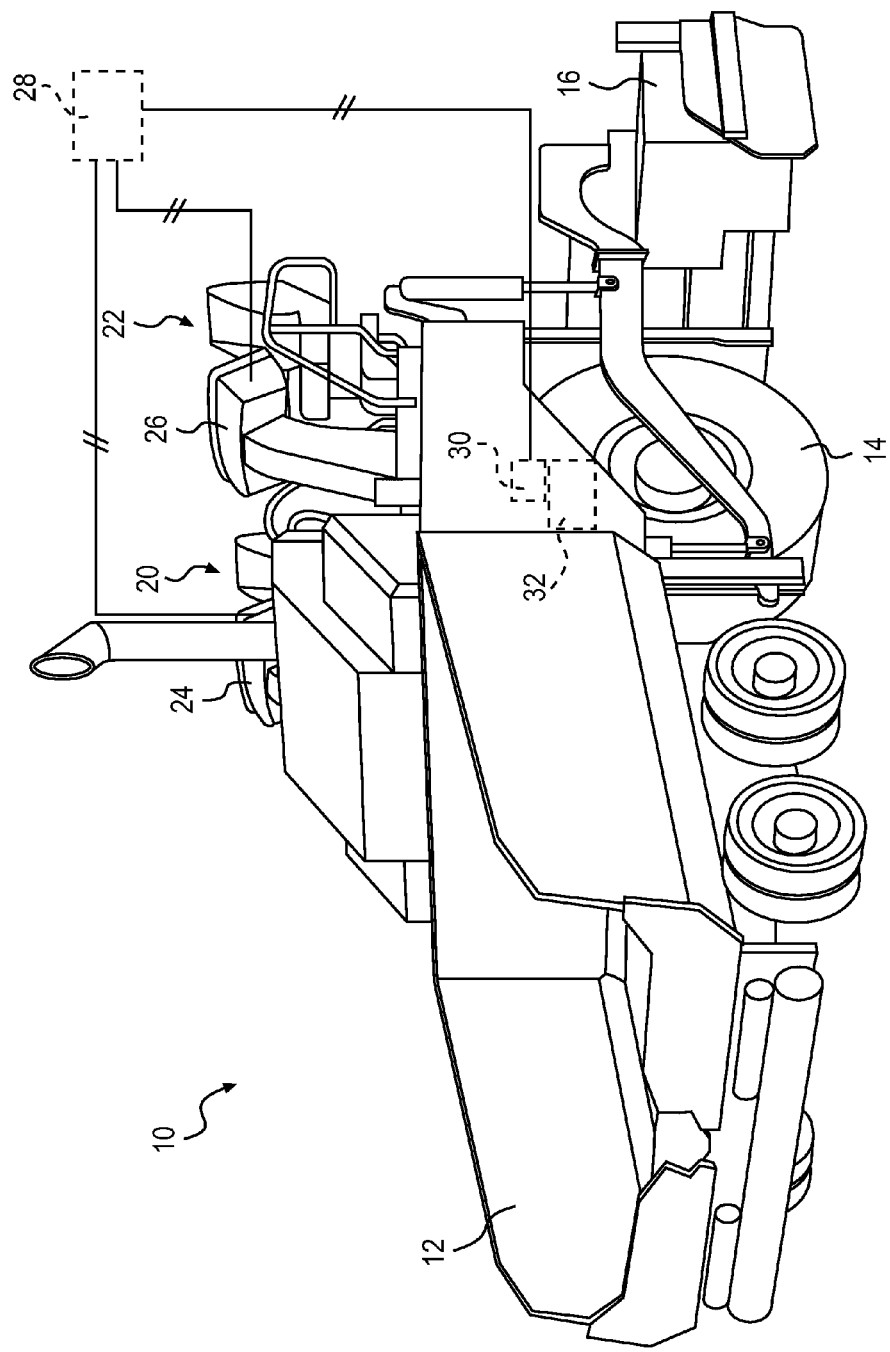
FIG. 1 is a diagrammatic illustration of an exemplary paving machine.

FIG. 1 illustrates an exemplary paving machine 10 having a hopper 12, one or more traction device 14, and a screed 16. Asphalt may be loaded into hopper 12 of paving machine 10. Traction device 14 may be powered by any suitable power source, such as an engine, and may be used to propel paving machine 10 along a surface 18 to be paved. Traction device 14 may be, for example, a plurality of wheels or a track system. Screed 16 may be used to smooth the asphalt applied to surface 18, and may include a generally flat surface running substantially perpendicular to a travel direction of paving machine 10. Screed 16 may be adjustable in various ways to properly smooth the asphalt as it is applied to surface 18. For example, screed 16 may be adjusted for height, angle, temperature, and/or vibration.

Paving machine 10 may have a first operator station 20 and a second operator station 22. First and second operator stations 20 and 22 may be situated atop paving machine 10, and at opposite sides thereof. First operator station 20 may have a first plurality of manual control devices 24 that allow an operator to control paving machine 10. Second operator station 22 may have a second plurality of substantially identical manual control devices 26 that may also allow the operator to control paving machine 10.

Traction device 14 may be controlled by the operator of paving machine 10 using control devices 24, 26 at first or second operator stations 20, 22. During the paving process, the operator may need to carefully control the speed of traction device 14 in order to properly spread paving material onto surface 18.

Paving machine 10 further includes a processor 28 that is in communication with control devices 24, 26, as well as one or more sensors 30. Processor may be configured to execute instructions stored on computer readable medium to perform methods of operating paving machine 10. Sensor 30 may be employed to monitor various operating parameters of paving machine 10. In the disclosed example, sensor 30 monitors a parking brake 32. Parking brake 32 may be employed to ensure that paving machine 10 remains stopped. Sensor 30 may alternatively or also monitor numerous other functions or conditions such as travel speed. The operation of processor 28 and sensors 30 will be further explained with reference to FIG. 3.

Figure 2:
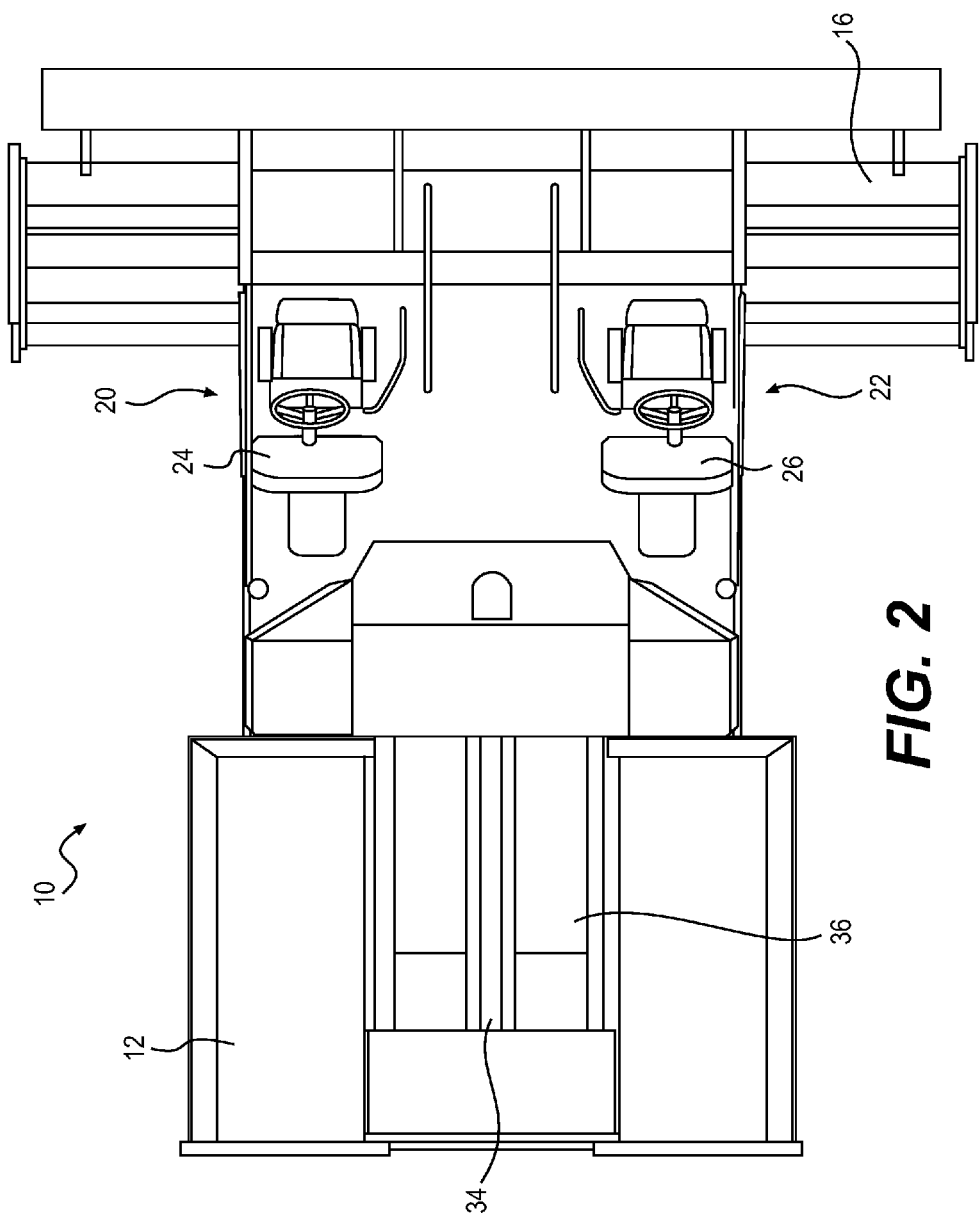
FIG. 2 is an overhead view of the paving machine of FIG. 1.

FIG. 2 shows an overhead view of paving machine 10. In the disclosed embodiment, Hopper 12 includes a conveyor system 34 that feeds asphalt through a passage in hopper 12 to surface 18. Hopper 12 may be loaded with any known paving material, such as asphalt. Once it is loaded, hopper 12 may be used to store and convey the paving material to surface 18. This operation may require components such as a conveyor system 34 and/or an auger (not shown). In the exemplary embodiment, the operator of paving machine 10 may be able to control at least some of these components from first and second operator stations 20, 22 using control devices 24, 26. Conveyor system 34 may have multiple conveyor belts 36 that are independently controllable. Conveyor belt 36 may be controllable for operating characteristics such as speed and direction.

FIG. 3 illustrates an exemplary embodiment of control devices 24 and 26 that may be used to control different aspects of paving machine 10. In the disclosed example, a first manual control device 38 is a steering wheel used to control the direction of paving machine 10, while a second manual control device 40 is a throttle used to control the speed thereof. The speed and direction of conveyor belt 36 may be controlled by a third manual control device 42. The height of screed 16 may be controlled by a fourth manual control device 44, and the temperature and/or vibration characteristics of screed 16 may be controlled by a fifth manual control device 46. A sixth manual control device 48 may be used to set a parking brake 32, and a seventh manual control device 50 may be an emergency stop device that, when activated, halts paving machine 10 and its conveyor system 34. Control devices 24 may also include a monitor 52 that shows various operating parameters of paving machine 10. For example, monitor 52 may display the conveyor speed and direction, the machine speed, the screed temperature, or any other parameter of functionality of paving machine 10, as needed. There may be any number of additional or different controls associated with the same or different machine functions.

An eighth manual control device 54 may be used to generate a signal indicative of a desire to switch control between stations 20, 22. The operator of paving machine 10 may use control device 54 to initiate an operator station switching process that will be described in more detail below.

Operator stations 20 and 22 may be connected to a control system that includes a processor 28 in communication with control devices 24 and 26. The control system may also be connected to the systems of paving machine 10, such as hopper 12, traction device 14, and/or screed 16, in such a way as to provide control over them. Additionally, the control system may include sensors 30 that monitor various operating parameters of paving machine 10 such as the function of a parking brake 32, the forward travel speed of paving machine 10, and/or the temperature of screed 16.

FIG. 4 illustrates an exemplary method for operating paving machine 10. FIG. 4 will be discussed in more detail in the following section to further illustrate the disclosed concepts.

INDUSTRIAL APPLICABILITY

The disclosed control system may be applicable to any piece of machinery having multiple operator stations. The disclosed control system may allow for a seamless control transition between the operator stations. A seamless transition between operator stations may save the operator time as well as ensuring the consistency of the paving process. The operation of paving machine 10 will now be described by reference to FIG. 4.

During operation of paving machine 10, an operator may sit at first operator station 20 and use control devices 24 to control aspects of paving machine 10 (Step 56). Control devices 24 could be used to control any or all of the systems of paving machine 10 including, but not limited to, hopper 12, traction device 14, or screed 16. An example of an operation of paving machine 10 may involve setting the forward speed of the machine to 10 meters per minute using manual control 40, setting the conveyor speed to 30 rpm using manual control 42, and setting the screed height to achieve a paving depth of 10 cm using manual control 44.

During operation of paving machine 10, the control settings may be received from first operator station 20 by processor 28, and those settings may be used to control the associated systems (Step 58). The control settings may be transmitted to processor 28 via a wired or wireless communication link, depending upon the application. When an operator desires to operate paving machine 10 from second operator station 22 instead of from first operator station 20, the operator may bring the forward motion of paving machine 10 to a stop (Step 60). For example, the operator may bring the vehicle speed to about 0 meters per minute using manual control 40, and engage parking brake 32 by pressing manual control 48. It is contemplated that the operator may not want to stop the machine, if, for example, there are multiple operators already monitoring the operator stations. Such an override may be provided in some embodiments.

The operator may then use manual control device 54 to indicate the desire to switch control to a second operator station (Step 62). Once processor 28 has received this signal (Step 64), it may ensure that the forward motion of paving machine 10 is stopped (Step 66). Processor 28 may ensure that machine 10 is stopped in any number of ways. One such method that may be employed includes sensing the speed of paving machine 10 and comparing that speed to a threshold value (for example 0.1 meters per minute). Alternatively, or additionally, processor 28 may ensure that machine 10 is stopped by detecting whether or not parking brake 32 is set by using sensor 30.

Next, processor 28 may automatically adjust control settings on second operator station 22 to at least substantially match the settings of first station 20 (Step 68). In most embodiments, the control settings will exactly match, however in some applications, the control settings may not exactly match. Once the control settings on the two operator stations 20, 22 are at least substantially the same, processor 28 may deactivate first operator station 20 in order to prevent conflicting control inputs (Step 70). This deactivation may be effected by ignoring inputs from operator station 20, powering down operator station 20, or any other suitable means of preventing operator station 20 from controlling paving machine 10.

Upon moving to second operator station 22, the operator may then use control devices 26 to resume control of paving machine 10 (Step 72). Second operator station 22 may become active automatically upon the deactivation of first operator station 20, after some time delay, or after some input from the operator. For example, the operator may disengage parking brake 32 by pressing manual control 48, and verify the operating conditions as displayed on monitor 52. The operator may then use manual control 40 to bring the vehicle speed back up to 10 meters per minute and continue paving operations.

The disclosed control system may not require the operator of paving machine 10 to remember the control settings of first operator station 20 when switching control to second operator station 22. Furthermore, the disclosed control system may not require an operator to manually set the control settings on second operator station 22 before resuming paving operations. These features of the disclosed control system may result in time savings during the process of switching operator stations, as well as consistency of the paving process without regard to which operator station is used. The operator may save time as a result of no longer having to take multiple trips from operator station to operator station to verify and input the various control settings before resuming paving operations. Further, because the operator does not have to manually input control settings into the second operator station, there may be a decreased likelihood of error. Since errors in the control settings may cause defects in the paving process, reducing the likelihood of such errors may also increase the consistency of the paving process.

It will be apparent to those skilled in the art that various modifications and variations can be made to the disclosed paving machine. Other embodiments will be apparent to those skilled in the art from consideration of the specification and practice of the disclosed paving machine. For example, although the control system is described relative to a paving machine, it may be used in conjunction with another type of machine, if so desired. It is intended that the specification and examples be considered as exemplary only, with a true scope being indicated by the following claims and their equivalents.

LIST OF ELEMENTS

10. Paving Machine
12. Hopper
14. Traction Device
16. Screed
18. Surface
20. First Operator Station
22. Second Operator Station
24. First Plurality of Manual Control Devices
26. Second Plurality of Manual Control Devices
28. Processor
30. Sensor
32. Parking Brake
34. Conveyor System
36. Conveyor Belt
38. First Manual Control Device (Steering Wheel)
40. Second Manual Control Device (Throttle)
42. Third Manual Control Device (Conveyor Control)
44. Fourth Manual Control Device (Screed Height Control)
46. Fifth Manual Control Device (Screed Temperature/Vibration Control)
48. Sixth Manual Control Device (Parking Brake Control)
50. Seventh Manual Control Device (Emergency Stop)
52. Monitor
54. Eighth Manual Control Device (Station Switch Control)
56. Step: Operate Machine From a First Operator Station
58. Step: Receive Control Settings From a First Operator Station
60. Step: Bring the Forward Motion of the Paving Machine to a Stop
62. Step: Signal Desire to Switch Control to a Second Operator Station
64. Step: Receive Signal to Switch to a Second Operator Station
66. Step: Ensure that the Paving Machine is Stopped
68. Step: Match Settings on the Second Operator Station to the First
70. Step: Deactivate the First Operator Station
72. Step: Operate Machine From a Second Operator Station

What is claimed is:

1. A method of operating a paving machine having dual operating stations thereon, comprising:
   receiving machine control settings from an operator for a first operator station;
   receiving an input indicative of desire to switch control to a second operator station;
   automatically adjusting control settings of the second operator station to substantially match the control settings of the first operator station based on the input; and
   deactivating the first operator station once the control settings of the second operator station substantially match those of the first operator station.

2. The method of claim 1, wherein receiving the input includes receiving the input via the first operator station.

3. The method of claim 2, further including:
   sensing a forward travel speed of the paving machine;
   comparing the forward travel speed to a threshold value; and
   automatically adjusting the control settings of the second operator station only if the forward travel speed is less than the threshold value.

4. The method of claim 3, wherein the threshold value is about 0.1 meters per minute.

5. The method of claim 2, further including detecting whether a parking brake is set, wherein automatically adjusting includes automatically adjusting the control settings only when the parking brake is set.

6. The method of claim 1, further including automatically adjusting control settings of the second operator station only after receiving the input indicative of desire to switch control to the second operator station.

7. The method of claim 1, wherein the control settings include a setting configured to provide control over a conveyor system.

8. The method of claim 1, wherein the control settings include a setting configured to provide control over a heating associated with a screed.

9. The control system of claim 1, wherein the control settings include a setting configured to provide control over vibration of a screed.

10. The method of claim 1, wherein the control settings include a setting configured to provide control over raising and lowering of a screed.

11. The control system of claim 1, wherein the control settings include a setting configured to provide control over a travel speed of the machine.

12. A control system for a paving machine having dual operating stations thereon, comprising:
- a first operator station having a first plurality of manual control devices;
- a second operator station having a second plurality of manual controls substantially identical to the first plurality of manual control devices; and
- a processor in communication with the first and second pluralities of manual control devices and configured to:
  - receive control settings for the first operator station;
  - receive an input indicative of a desire to switch control to the second operator station; and
  - automatically adjusting control settings for the second operator station to substantially match the control settings of the first operator station based on the input.

13. The control system of claim 12, wherein the first operator station is located at one side of the machine, and the second operator station is located on an opposite side of the machine.

14. The control system of claim 12, wherein the processor is further configured to deactivate the first operator station once the control settings of the second operator station substantially match those of the first operator station.

15. The control system of claim 12, wherein the control settings include a setting configured to provide control over a conveyor system for paving material.

16. The control system of claim 12, wherein the control settings include a setting configured to provide control over heating of a screed or a hopper.

17. The control system of claim 12, wherein the control settings include a setting configured to provide control over vibration of a screed or a hopper.

18. The control system of claim 12, wherein the control settings include a setting configured to provide control over the raising and lowering of a screed.

19. The control system of claim 12, wherein the control settings include a setting configured to provide control over a travel speed of the machine.

20. A paving machine having dual operating stations thereon, comprising:
- a hopper for holding paving material before it is applied to a surface;
- a screed for smoothing paving material as it is applied to the surface;
- a traction device for propelling the machine along the surface;
- a first operator station located at one side of the machine and having a first plurality of manual control devices;
- a second operator station located at an opposite side of the machine and having a second plurality of manual controls substantially identical to the first plurality; and
- a processor in communication with the first and second pluralities of manual control devices and configured to:
  - receive control settings for the first operator station associated with operation of at least one of the hopper, the screed, and the traction device;
  - receive an input via the first operator station indicative of desire to switch control to the second operator station; and
  - automatically adjust control settings for the second operator station to substantially match the control settings of the first operator station based on the input.

* * * * *